United States Patent
Gotou et al.

(10) Patent No.: US 11,299,178 B1
(45) Date of Patent: Apr. 12, 2022

(54) VEHICLE TRAVEL CONTROL METHOD AND VEHICLE TRAVEL CONTROL DEVICE

(71) Applicants: Nissan Motor Co., Ltd., Yokohama (JP); Renault S.A.S., Boulogne-Billancourt (FR)

(72) Inventors: Akinobu Gotou, Kanagawa (JP); Satoshi Tange, Kanagawa (JP)

(73) Assignees: Nissan Motor Co., Ltd., Yokohama (JP); Renault S.A.S., Boulogne-Billancourt (FR)

( * ) Notice: Subject to any disclaimer, the term of this patent is extended or adjusted under 35 U.S.C. 154(b) by 0 days.

(21) Appl. No.: 17/432,319

(22) PCT Filed: Mar. 1, 2019

(86) PCT No.: PCT/IB2019/000293
§ 371 (c)(1),
(2) Date: Aug. 19, 2021

(87) PCT Pub. No.: WO2020/178608
PCT Pub. Date: Sep. 10, 2020

(51) Int. Cl.
*B60W 60/00* (2020.01)
*B60W 30/095* (2012.01)
*B60W 10/18* (2012.01)
*B60W 10/20* (2006.01)

(52) U.S. Cl.
CPC ........ *B60W 60/0015* (2020.02); *B60W 10/18* (2013.01); *B60W 10/20* (2013.01); *B60W 30/0956* (2013.01); *B60W 60/0027* (2020.02); *B60W 2554/4041* (2020.02); *B60W 2554/80* (2020.02); *B60W 2720/103* (2013.01)

(58) Field of Classification Search
None
See application file for complete search history.

(56) References Cited

U.S. PATENT DOCUMENTS

| 2002/0023793 | A1 | 2/2002 | Hattori et al. |
| 2014/0365104 | A1 | 12/2014 | Sasaki |
| 2015/0224988 | A1* | 8/2015 | Buerkle ............ B60W 30/0956 701/45 |

(Continued)

FOREIGN PATENT DOCUMENTS

| DE | 10 2004 057060 A1 | 6/2006 |
| EP | 1749687 A1 | 2/2007 |
| JP | 2004-299593 A | 10/2004 |

(Continued)

*Primary Examiner* — Tamara L Weber
(74) *Attorney, Agent, or Firm* — Young Basile Hanlon & MacFarlane, P.C.

(57) ABSTRACT

A travel control method for a vehicle having an autonomous travel control function includes: detecting an oncoming vehicle travelling in the opposite lane of the travel lane in which the subject vehicle travels; predicting whether or not the oncoming vehicle enters into the travel lane in which the subject vehicle travels; when it is predicted that the oncoming vehicle enters into the travel lane in which the subject vehicle travels, setting initial deceleration of the subject vehicle in a case of time until the subject vehicle and the oncoming vehicle pass each other being relatively long to a smaller value than the initial deceleration in a case of the time being relatively short; and executing deceleration travel control of the subject vehicle.

18 Claims, 9 Drawing Sheets

(56) References Cited

U.S. PATENT DOCUMENTS

2018/0362028 A1* 12/2018 Prokhorov ......... B60W 60/0011

FOREIGN PATENT DOCUMENTS

| JP | 2009-023399 A | 2/2009 |
| JP | 2010-097261 A | 4/2010 |
| JP | 2013-030149 A | 2/2013 |
| JP | 2016-030537 A | 3/2016 |

* cited by examiner

VEHICLE TRAVEL CONTROL METHOD AND VEHICLE TRAVEL CONTROL DEVICE

TECHNICAL FIELD

The present invention relates to a travel control method and a travel control device of a vehicle.

BACKGROUND

A device for predicting a route of a vehicle is known in which when an oncoming vehicle (a vehicle traveling toward a subject vehicle from ahead of the subject vehicle) travelling in an opposite lane of a subject vehicle overpasses a preceding vehicle of the oncoming vehicle, at a situation in which the oncoming vehicle strays from the opposite lane onto a subject lane, whether the oncoming vehicle overtakes the preceding vehicle is determined, and when it is determined that the oncoming vehicle overtakes the preceding vehicle. Then, a realization probability is calculated so that the realization probability represents a probability of a route in which a vehicle travels across a lane to an opposite lane side being realized relatively higher than the realization probability calculated when it is determined that the oncoming vehicle does not overtake the preceding vehicle (JP2010-097261A).

SUMMARY

The conventional device for predicting the route of the vehicle has functions for generating a plurality of routes that can be adopted by the subject vehicle on a basis of subject vehicle data. The plurality of possible routes include a condition in which the subject vehicle decelerates or stops in order to wait for completion of overtake by an overtaking vehicle when a following vehicle overtakes its preceding vehicle in the opposite lane. Refer to paragraph of JP2010-097261A.

However, in the above-mentioned JP2010-097261A, in a situation in which the oncoming vehicle strays from the opposite lane onto the subject lane in order to overtake its preceding vehicle while the subject vehicle travels, contents of travel control for the subject vehicle to decelerate or stop the subject vehicle is not disclosed. Now, it supposes that the subject vehicle decelerates with constant deceleration and waits for that the oncoming vehicle passes by the subject vehicle. In such cases, when the passing position with the oncoming vehicle is close to a current position of the subject vehicle, such as when the oncoming vehicle finishes overtaking at high-speed contrary to expectations, the jerk (a derivative value of acceleration or a rate of change in acceleration per unit time) at the time of switching to acceleration travel control is increased. This increase of the jerk discomforts an occupant of the subject vehicle.

The problem to be solved by the present invention is to provide the travel control method and the travel control device for a vehicle that can suppress discomfort of the occupant in the scene in which the subject vehicle and the oncoming vehicle pass each other.

The present invention solves the problem mentioned above by setting initial deceleration of the subject vehicle in a case of time until the subject vehicle and the oncoming vehicle pass each other being relatively long to a smaller value than the initial deceleration in a case of the time being relatively short, when it is predicted that the oncoming vehicle travelling in the opposite lane of the travel lane in which the subject vehicle travels enters into the travel lane in which the subject vehicle travels; and executing deceleration travel control of the subject vehicle.

According to the present invention, when the oncoming vehicle is predicted to enter into the travel lane of the subject vehicle, the deceleration travel control is performed with the relatively small deceleration initially. This allows to secure long grace time for determining whether to stop or reaccelerate the subject vehicle. As a result, the jerk can be decreased when it is determined that reacceleration is performed, and the discomfort of the occupant can be suppressed.

DETAILED DESCRIPTION

Figure 1:
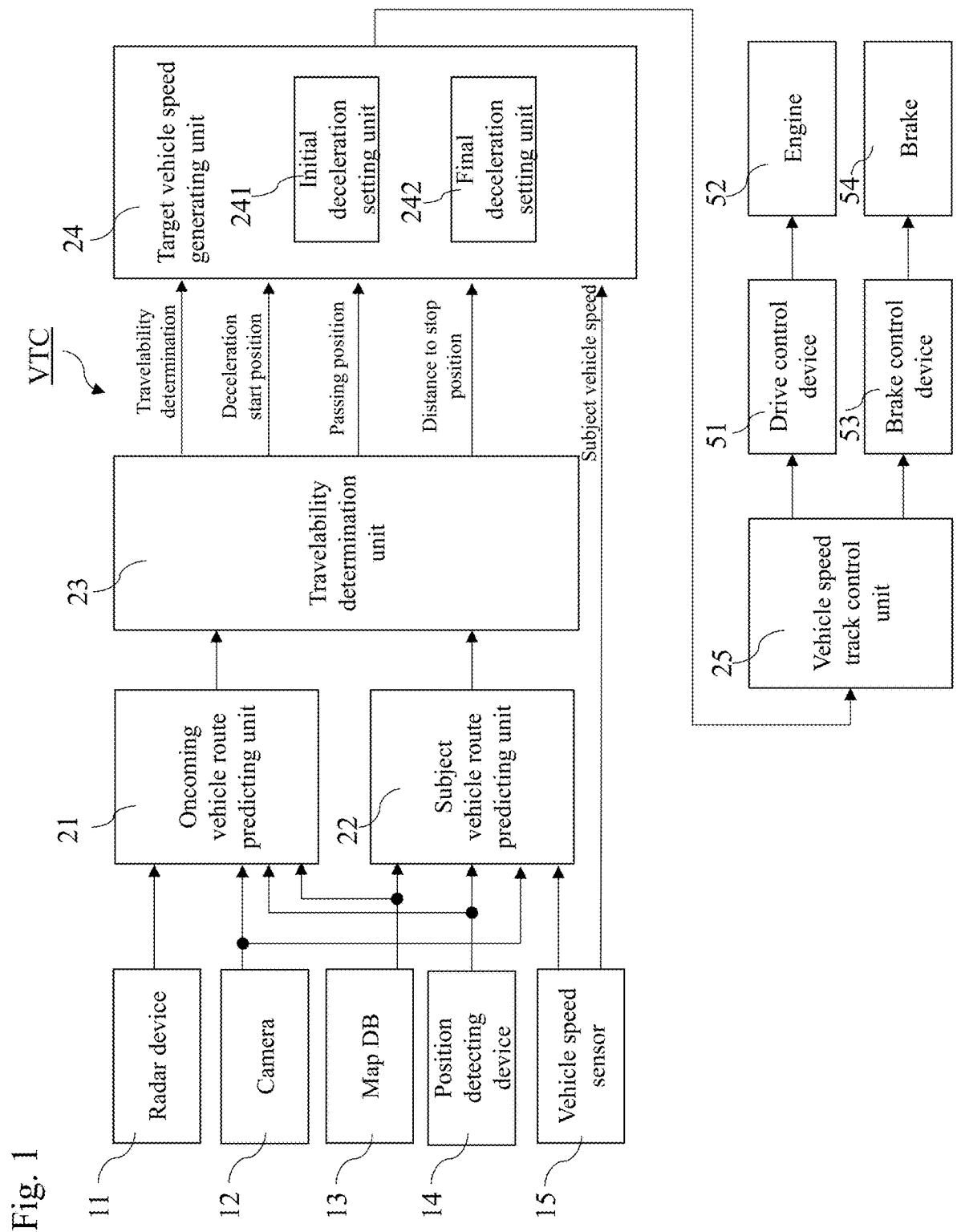
FIG. 1 is a block diagram illustrating an embodiment of the travel control device for a vehicle of the present invention.

FIG. 1 is the block diagram illustrating features of the travel control device for a vehicle VTC according to the present embodiment. The travel control device is also referred to as a Vehicle Travel Controller (VTC). FIGS. 3 to 7 are plan views illustrating examples of the passing scenes, and graphs illustrating deceleration profiles corresponding to the scenes. The travel control device for a vehicle VTC of the present embodiment is also an embodiment of implementing the travel control method for a vehicle according to the present invention. As shown in FIG. 1, the travel control device for a vehicle VTC of the present embodiment includes a radar device 11, a camera 12, a map database 13, a position detecting device 14, a vehicle speed sensor 15, an oncoming vehicle route predicting unit 21, a subject vehicle route predicting unit 22, a travelability determination unit 23, a target vehicle speed generating unit 24, and a vehicle speed track control unit 25. Incidentally, among the unit and devices as shown in FIG. 1, the drive control device 51, the engine 52, the brake control device 53 and the brake 54 are components of the vehicle. Further, the terms of the subject vehicle V1, the oncoming vehicle V2, a parked vehicle V3, the travel lane L1, the opposite lane L2, a current position P1 of the subject vehicle V1, a stop position P2 of the subject vehicle V1, a passing position P3, a deceleration start position P4, and an approach route R of the oncoming vehicle V2 are related to the travel scenes as shown in FIGS. 3 to 7. The terms are explained below.

Among the units comprising the travel control device for a vehicle VTC, the radar device 11, the camera 12, the position detecting device 14, and the vehicle speed sensor 15 are composed of various sensors as described later. The map database 13 is composed of memories. Also, among the units comprising the travel control device for a vehicle VTC, the oncoming vehicle route predicting unit 21, the subject vehicle route predicting unit 22, the travelability determination unit 23, the target vehicle speed generating unit 24, and the vehicle speed track control unit 25 are composed of one or more computers, and software installed in the computers. The computer comprises a ROM storing a program for having the respective units such as the oncoming vehicle route predicting unit 21, the subject vehicle route predicting unit 22, the travelability determination unit 23, the target vehicle speed generating unit 24, and the vehicle speed track control unit 25 to function, a CPU executing the program stored in the ROM, and a RAM functioning as an accessible storage device. As operation circuits, an MPU, a DSP, an ASIC, an FPGA, and the like can be used instead of or together with the CPU.

The radar device 11 comprises a laser range finder (LRF) provided at a front portion of the vehicle and/or a radar using a millimeter wave or an ultrasonic wave. The radar device 11 outputs information signal on a target or an obstacle to the oncoming vehicle route predicting unit 21. The laser range finder irradiates a laser beam, which is an output wave for measuring a distance, to an area in front of the vehicle, and detects the reflected wave (detection wave). This generates a ranging signal indicating the target around the vehicle and a relative position between the target and the vehicle. The target is, for example, another vehicle travelling in a travelable road in which the vehicle travels, a motorcycle, a bicycle, a pedestrian, a lane segment line on a road surface, a curb at a shoulder of a road, a guardrail, a wall-surface, a fill, and the like. In addition, the radar using the millimeter or ultrasonic wave irradiates the millimeter wave or the ultrasonic wave in front of the vehicle to scan a predetermined area around the subject vehicle. This allows to detect the obstacle such as the other vehicle, the motorcycle, the bicycle, the pedestrian, the curb of the shoulder of the road, the guardrail, the wall-surface, and the fill that exist around the subject vehicle. For example, the radar device detects the relative position (an azimuth direction) between the obstacle and the subject vehicle, the relative speed of the obstacle, the distance between the subject vehicle and the obstacle, and the like as a situation around the subject vehicle.

The camera 12 is provided in front of the vehicle, rear of the vehicle and side of the vehicle (i.e., an entire circumference of the vehicle), and outputs the information signal of the target and the obstacle to the oncoming vehicle route predicting unit 21 and the subject vehicle route predicting unit 22. The camera 12 is an image sensor for acquiring image data by capturing a predetermined area of the front, the rear, or the side of the subject vehicle, and includes, for example, a CCD wide-angle camera provided in an upper portion of a front windshield within a vehicle cabin, in left-side and right-side mirrors, in a trunk lid, and the like. The camera 12 may be a stereoscopic camera or an omni-directional camera and may include a plurality of the image sensors. The camera 12 detects a road existing ahead of, behind, or in sides of the subject vehicle and a structure, a road sign, a signage, the other vehicle, the motorcycle, the bicycle, the pedestrian, and the like as the situation around the subject vehicle from the acquired image data.

The map database 13 stores three-dimensional high-definition map information. The map database 13 is a memory accessible from the oncoming vehicle route predicting unit 21 and the subject vehicle route predicting unit 22. The three-dimensional high-definition map information stored in the map database 13 is three-dimensional map information based on a road shape detected when a vehicle for acquiring data travels on the road actually. The three-dimensional high-definition map information is map information to which, together with the map information, detailed and high-definition positional information such as a merge point of the road, a branch point, a tollgate, a position at which the number of lanes decreases, a service area, a parking area and the like are related as three-dimensional information.

The position detecting device 14 comprises a GPS unit, a gyro sensor, and a vehicle speed sensor, and the like. The position detecting device 14 detects radio waves transmitted from a plurality of satellite communications by the GPS unit and periodically acquires positional information of the subject vehicle. At the same time, the position detecting device 14 detects the current positional information of the subject vehicle on a basis of the acquired positional information of the subject vehicle, angle change information acquired from the gyro sensor, and vehicle speed acquired from the vehicle speed sensor. The detected positional information of the subject vehicle is output to the oncoming vehicle route predicting unit 21 and the subject vehicle route predicting unit 22.

The vehicle speed sensor 15 measures rotational speed of a drivetrain of the vehicle, such as a drive shaft, and detects travel speed of the subject vehicle on a basis of the measurement result. Hereinafter, the travel speed is also referred to as "vehicle speed". The vehicle speed information of the subject vehicle detected by the vehicle speed sensor 15 is output to the subject vehicle route predicting unit 22 and the target vehicle speed generating unit 24.

The oncoming vehicle route predicting unit 21 acquires a distance between the subject vehicle and a target around the subject vehicle output from the radar device 11 and the image data around the subject vehicle output from the camera 12 at a predetermined time interval. Thus, the oncoming vehicle route predicting unit 21 detects whether the other vehicle exists around the subject vehicle. In addition, the oncoming vehicle route predicting unit 21 detects whether the detected other vehicle is the oncoming vehicle travelling in the opposite lane of the travel lane in which the subject vehicle travels. When the detected other vehicle is the oncoming vehicle, it is predicted whether the oncoming vehicle enters into the travel lane in which the subject vehicle travels. And when it is predicted that the oncoming vehicle enters into the travel lane in which the subject vehicle travels, an approach route R of the oncoming vehicle is predicted.

Figure 3:
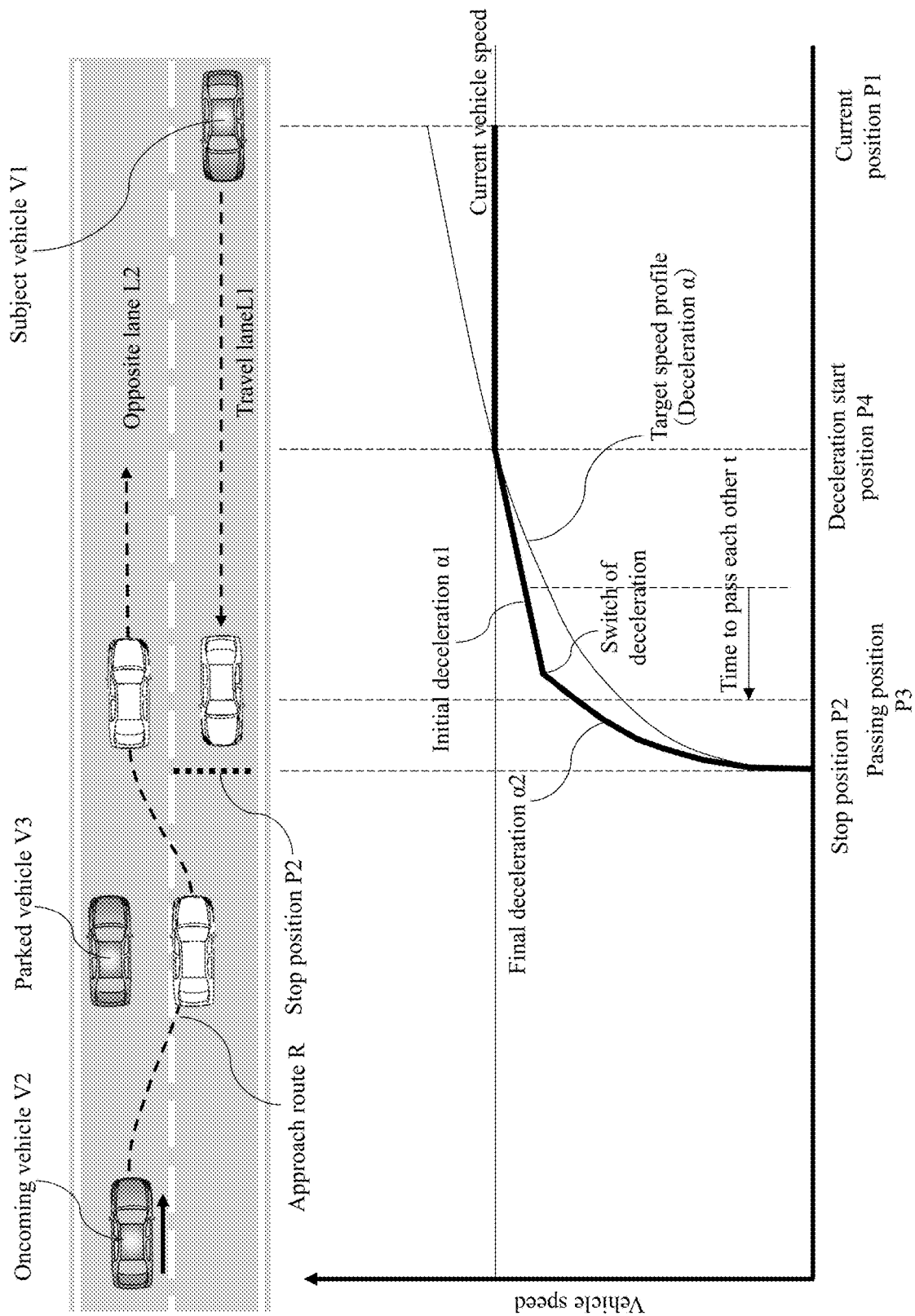
FIG. 3 is a plan view illustrating a first example of the passing scene and a graph illustrating the deceleration profile corresponding to this scene.

Functions of the oncoming vehicle route predicting unit 21 are explained on a basis of the travel scene as shown in FIG. 3. In the travel scene shown in FIG. 3, in a two-lane road that is left-hand traffic, the subject vehicle V1 travels in the travel lane L1 to the left of FIG. 3, and the oncoming vehicle V2 travels in the opposite lane L2 to the right of FIG. 3. In the travel scene shown in FIG. 3, the parked vehicle V3 is parked ahead of the oncoming vehicle V2 on the opposite lane L2. For this reason, in the travel scene shown in FIG. 3, the oncoming vehicle V2 travels along the approach route R that strays onto the travel lane L1 in order to overtake the parked vehicle V3.

In such a travel scene, the oncoming vehicle route predicting unit 21 of the travel control device VTC mounted on the subject vehicle V1 detects the existence of the oncoming vehicle V2 and the parked vehicle V3 from the information signal from the radar device 11 and the camera 12. At the same time, the oncoming vehicle route predicting unit 21 recognizes the road information around the subject vehicle V1 by the information signal from the map database 13 and the position detecting device 14. The oncoming vehicle route predicting unit 21 recognizes that the subject vehicle V1 travels in the travel lane L1, the oncoming vehicle V2 travels in the opposite lane L2 toward the subject vehicle V1, and the parked vehicle V3 is parked on the opposite lane L2 ahead of the oncoming vehicle V2. At the same time, the oncoming vehicle route predicting unit 21 detects the vehicle speed of the subject vehicle V1, the vehicle speed of the oncoming vehicle V2, the vehicle speed of the parked vehicle V3, the distance between the subject vehicle V1 and the oncoming vehicle V2, the distance between the subject vehicle V1 and the parked vehicle V3, and a trajectory of the oncoming vehicle V2. The trajectory of the oncoming vehicle V2 is a temporal change of the position of the oncoming vehicle V2. Note that the oncoming vehicle V2 is not limited to the vehicle traveling on the opposite lane L2, and includes the vehicle traveling toward the subject vehicle while straying from the opposite lane L2.

With these information signals, the oncoming vehicle route predicting unit 21 detects whether the other vehicles V2, V3 exist around the subject vehicle V1. Next, it is detected whether the detected other vehicles V2, V3 are the oncoming vehicle V2 that travels in the opposite lane L2 of the travel lane L1 in which the subject vehicle V1 travels. When the detected other vehicles V2, V3 are the oncoming vehicle V2, it is predicted whether the oncoming vehicle V2 enters into the travel lane L1 in which the subject vehicle V1 travels. When the oncoming vehicle V2 is predicted to enter into the travel lane L1 in which the subject vehicle V1 travels, such as to avoid the parked vehicle V3, the approach route R is also predicted.

Note that whether the oncoming vehicle V2 enters into the travel lane L1 in which the subject vehicle V1 travels can be predicted on a basis of conditions such as whether the trajectory of the oncoming vehicle V2 heads to the travel lane L1 in which the subject vehicle V1 travels, the trajectory of the oncoming vehicle V2 being determined by temporal change of the position of the oncoming vehicle V2, or whether the parked vehicle V3 exists in the opposite lane L2, whether the oncoming vehicle V2 is sufficiently close to the parked vehicle V3 as compared to the distance between the subject vehicle V1 and the parked vehicle V3, and whether the oncoming vehicle V2 is in the situation to be able to overtake the parked vehicle V3 with sufficient time. The approach route R of the oncoming vehicle V2 can be predicted on a basis of conditions of the position and the vehicle speed of the oncoming vehicle V2, the road shape of the opposite lane L2 and the travel lane L1, and the position and the shape (size) of the parked vehicle V3.

As described above, the oncoming vehicle route predicting unit 21 acquires the current position, the vehicle speed, and the approach route R of the oncoming vehicle V2 entering into the travel lane L1 in which the subject vehicle V1 travels. The oncoming vehicle route predicting unit 21 outputs these information signals to the travelability determination unit 23 at the predetermined time interval. The current position, the vehicle speed, and the approach route R of the oncoming vehicle V2 entering into the travel lane L1 in which the subject vehicle V1 travels change from time to time as travel time of the subject vehicle V1 elapses. Therefore, the oncoming vehicle route predicting unit 21 repeats the calculation at the predetermined time interval, and outputs them to the travelability determination unit 23.

The subject vehicle route predicting unit 22 generates a travel route corresponding to the destination that is input in advance by the driver. The subject vehicle route predicting unit 22 recognizes the current position of the subject vehicle V1 by the information signal from the position detecting device 14 in order to drive the subject vehicle V1 along the travel route. The subject vehicle route predicting unit 22 recognizes the travel lane L1 of the subject vehicle V1 by the information signal from the map database 13. Further, the subject vehicle route predicting unit 22 recognizes the vehicle speed of the subject vehicle V1 by the information signal from the vehicle speed sensor 15. Then, the subject vehicle route predicting unit 22 acquires the information signal on the target and the obstacle around the subject vehicle V1 from the camera 12 at the predetermined time interval. As a result, the subject vehicle V1 travels along the travel lane L1. At the same time, in order to comply with the Road Acts, the subject vehicle route predicting unit 22 executes speed control corresponding to the target such as a traffic light, a crosswalk, or a stop sign when they are detected. In addition, when the obstacle such as the pedestrian or the other vehicle is detected by the camera 12, the speed control or trajectory control is executed to avoid the contact with the obstacle. The subject vehicle route predicting unit 22 determines the travel route, the current position, and the vehicle speed of the subject vehicle V1 as described above. Then, the subject vehicle route predicting unit 22 outputs these information signals to the travelability determination unit 23 at the predetermined time interval. The travel route, the current position, and the vehicle speed of the subject vehicle V1 change from time to time as the travel time of the subject vehicle V1 elapses. Therefore, the subject vehicle route predicting unit 22 repeats the calculation at the predetermined time interval, and outputs them to the travelability determination unit 23.

First, the travelability determination unit 23 determines whether the subject vehicle V1 comes into contact with the oncoming vehicle V2 when the subject vehicle V1 travels at the current speed without the deceleration. That is, the travelability determination unit 23 determines whether the subject vehicle V1 and the oncoming vehicle V2 can pass each other without comes into contact with each other in the travel scene as shown in FIG. 3, on a basis of the current position, the vehicle speed and the approach route R of the oncoming vehicle V2 output from the oncoming vehicle route predicting unit 21 and the travel route, the current position and the vehicle speed of the subject vehicle V1 output from the subject vehicle route predicting unit 22.

In this determination, the travelability determination unit 23 sets the stop position P2 of the subject vehicle V1 from the approach route R of the oncoming vehicle V2. In the travel scene shown in FIG. 3, the approach route R of the oncoming vehicle V2 is predicted by the oncoming vehicle route predicting unit 21. And the stop position of the subject vehicle V1 that does not come into contact with the oncoming vehicle V2 traveling along the approach route R is set. Specifically, as shown in FIG. 3, the position before the oncoming vehicle V2 changes lanes to return from the travel lane L1 into which the oncoming vehicle V2 entered to the original opposite lane L2 is set to the stop position P2 of the subject vehicle V1. The stop position P2 can be set only by the approach route R of the oncoming vehicle V2 regardless of the current position or the vehicle speed of the subject vehicle V1. Alternatively, the stop position P2 may be set to the position predetermined distance away from the parked vehicle V3 on a basis of, for example, the position of the parked vehicle V3 of the opposite lane L2.

In the travel scene shown in FIG. 3, it is assumed that the distance between the current position of the subject vehicle V1 and the oncoming vehicle V2 is detected to be L, the vehicle speed of the subject vehicle V1 is detected to be v1, and the vehicle speed of the oncoming vehicle V2 is detected to be v2. In this case, since the time t until the two vehicles encounter (come into contact) is $L/(v1+v2)$, the encounter position is the position at which the subject vehicle V1 travels from the current position P1 by $L \cdot v1/(v1+v2)$. When the encounter position is a near side (closer to the subject vehicle V1) relative to the stop position P2 as shown in FIG. 3, or when it is a far side of the parked vehicle V3, at the present time, it is determined that the subject vehicle V1 can pass by the oncoming vehicle V2 without coming into contact with the oncoming vehicle V2 even when the subject vehicle V1 travels at the current speed without the deceleration. In this case, the information signal of "passable" is output to the target vehicle speed generating unit 24, and the previous speed control is continued.

On the other hand, the travelability determination unit 23 executes the deceleration control when it is determined that the subject vehicle V1 comes into contact with the oncoming vehicle V2 when the subject vehicle V1 travels at the current speed without the deceleration. In other words, the travelability determination unit 23 sets the target vehicle speed profile for controlling the travel with the predetermined reference deceleration α in order to execute the deceleration control for stopping the subject vehicle V1 at the stop position P2. Next, the travelability determination unit 23 calculates the passing position P3 at which the subject vehicle V1 and the oncoming vehicle V2 pass each other on a basis of the target vehicle speed profile and the vehicle speed of the oncoming vehicle V2. Then, the travelability determination unit 23 outputs to the target vehicle speed generating unit 24 at the predetermined time interval whether the subject vehicle V1 and the oncoming vehicle V2 can pass each other, the distance between the current position of the subject vehicle V1 to the stop position, the passing position P3 at which the subject vehicle V1 and the oncoming vehicle V2 pass each other, and the deceleration start position P4.

The deceleration start position P4 and the passing position P3 can be determined as follows. In the travel scene shown in FIG. 3, the stop position P2 of the subject vehicle V1 is set on a basis of the approach route R of the oncoming vehicle V2. First, the predetermined reference deceleration a that can be stop at the stop position P2 is set. For example, the a is set to between 1.0 and 1.4 m/s$^2$, the gentler deceleration that does not discomfort the occupant. The vehicle speed curve using the a is shown in FIG. 3 as a parabola of the target speed profile. The intersection of the straight line representing the current vehicle speed of the subject vehicle V1 and the parabola of the target speed profile is determined as the deceleration start position P4 of the subject vehicle V1. When the subject vehicle V1 travels while maintaining the current vehicle speed and starts the deceleration in accordance with the reference deceleration α of the target speed profile at the deceleration start position P4, the subject vehicle V1 is decelerated at the speed in accordance with the target speed profile and is stopped at the stop position P2. The passing position P3 at which the subject vehicle V1 and the oncoming vehicle V2 pass each other is calculated from the target speed profile and the vehicle speed of the oncoming vehicle V2 at this time.

Figure 4:
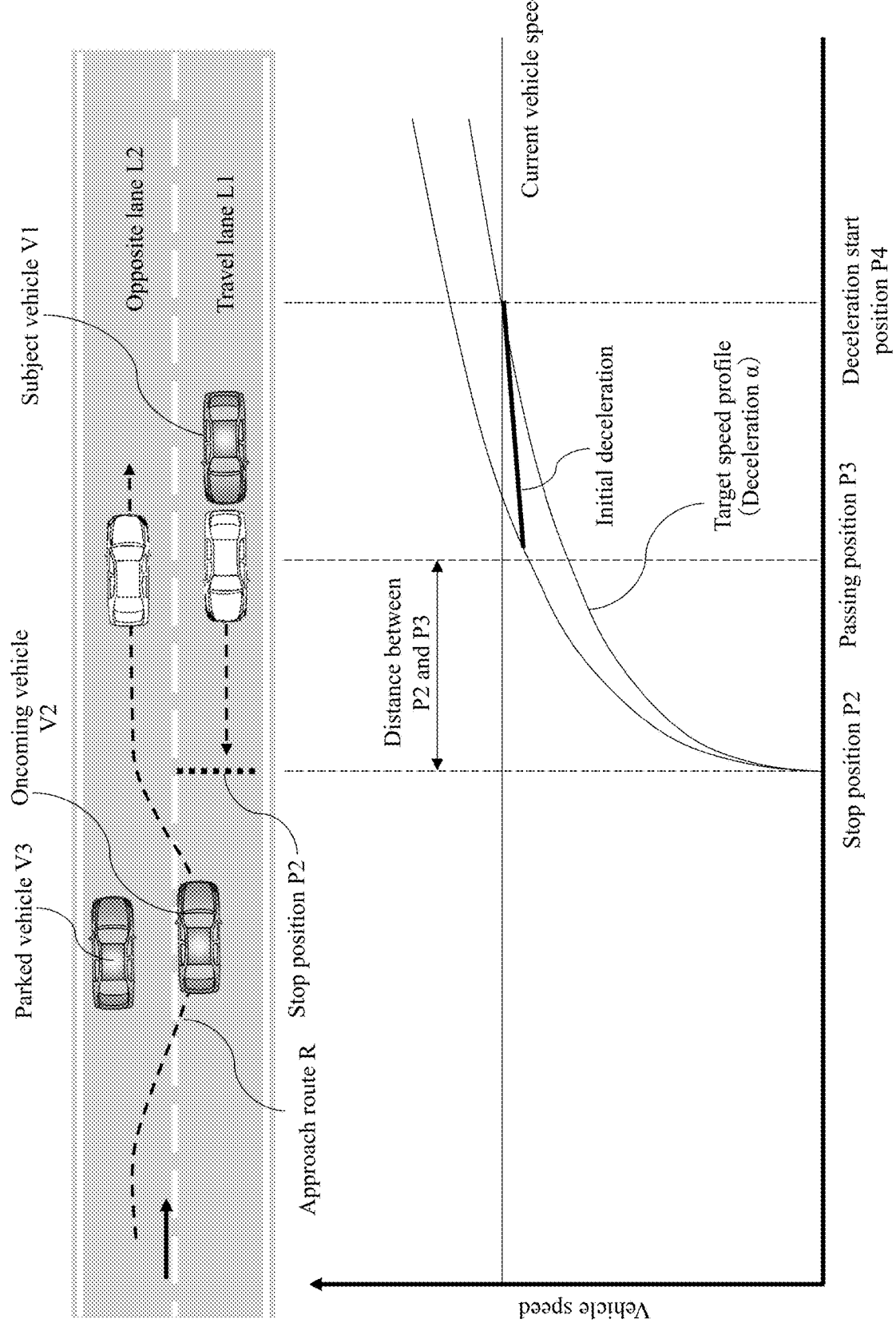
FIG. 4 is a plan view illustrating a second example of the passing scene and a graph illustrating the deceleration profile corresponding to this scene.
Figure 5:
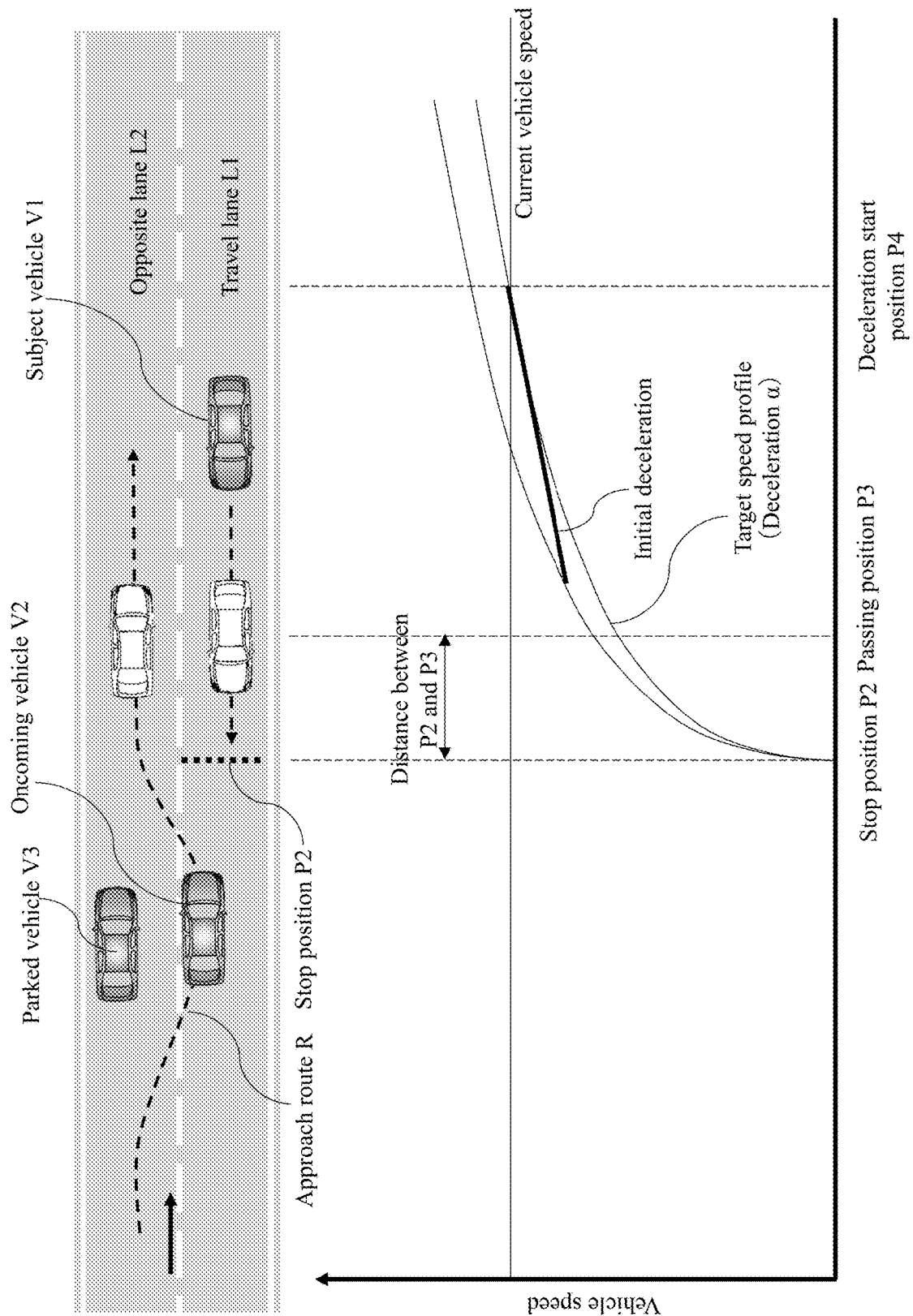
FIG. 5 is a plan view illustrating a third example of the passing scene and a graph illustrating the deceleration profile corresponding to this scene.
Figure 6:
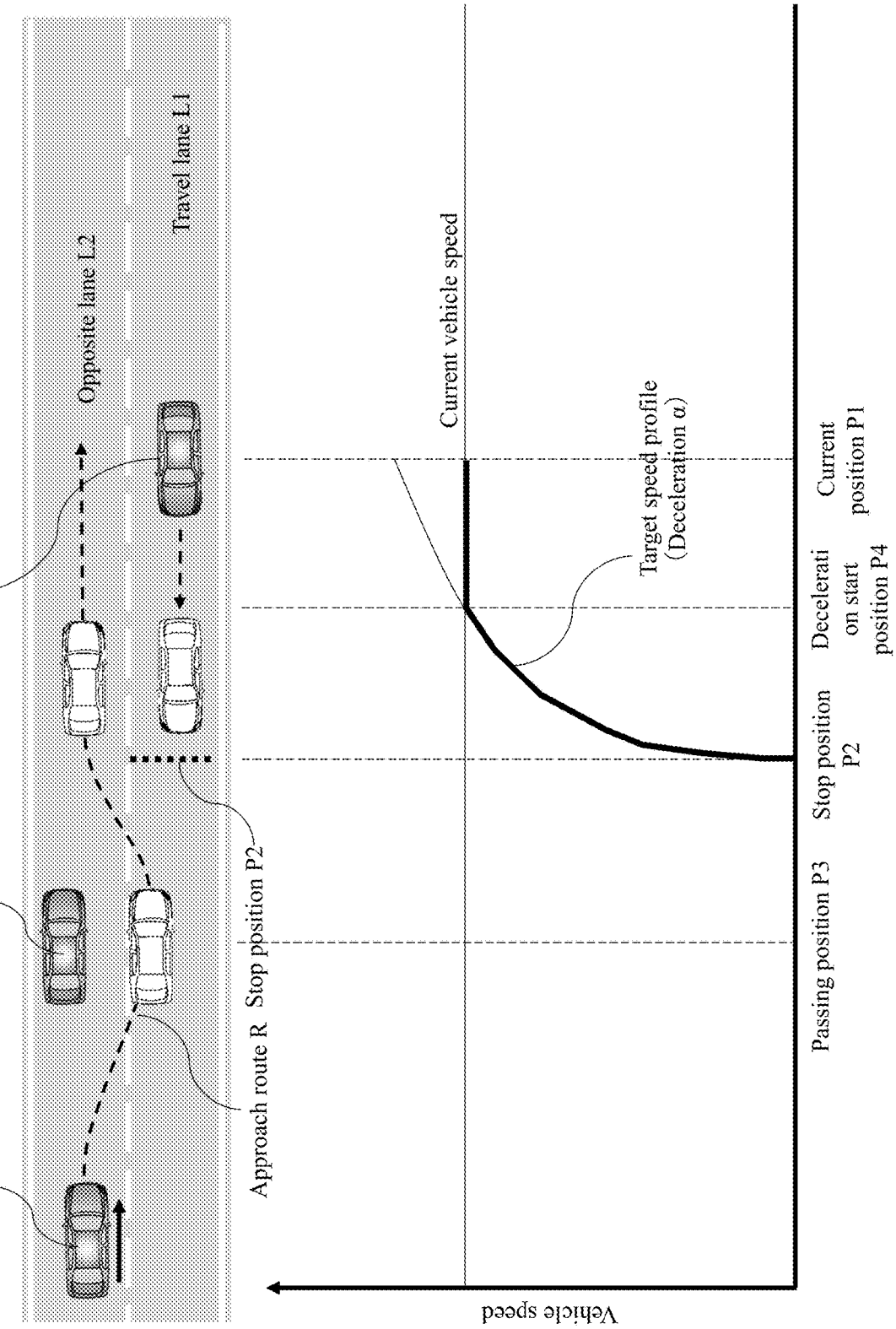
FIG. 6 is a plan view illustrating a fourth example of the passing scene and a graph illustrating the deceleration profile corresponding to this scene.

When the passing position P3 is located in the near side (closer to the subject vehicle V1) relative to the stop position P2 as shown in FIGS. 3 to 5, it is determined that at the present time, the subject vehicle V1 can pass by the oncoming vehicle V2 without comes into contact with the oncoming vehicle V2 so long as the subject vehicle V1 travels at the speed in accordance with the target speed profile. On the other hand, when the passing position P3 is located in the far side relative to the stop position P2 as shown in FIG. 6, it is determined that, at the present time, the subject vehicle V1 comes into contact with the oncoming vehicle V2 even when the subject vehicle V1 travels at the speed in accordance with the target speed profile. When the passing position P3 is located in the near side relative to the stop position P2 as shown in FIGS. 3 to 5, the travelability determination unit 23 outputs the information signal of "passable when decelerated with the reference deceleration a" to the target vehicle speed generating unit 24. On the other hand, when the passing position P3 is located in the far side relative to the stop position P2 as shown in FIG. 6, the information signal of "impassable even when decelerated with the reference deceleration α" is output to the target vehicle speed generating unit 24. At the same time, the travelability determination unit 23 outputs the distance between the current position to the stop position of the subject vehicle V1, the passing position P3 at which the subject vehicle V1 and the oncoming vehicle V2 pass each other, and the deceleration start position P4 to the target vehicle speed generating unit 24.

The target vehicle speed generating unit 24 acquires the travelability determination, the deceleration start position P4, the passing position P3, and the distance to the stop position P2 from the travelability determination unit 23, and the vehicle speed of the subject vehicle V1 from the vehicle speed sensor 15 at the predetermined time interval. In addition, the target vehicle speed generating unit 24 calculates and sets initial deceleration at an early stage when the subject vehicle V1 shifts to the deceleration control. Together with this, the target vehicle speed generating unit 24 sets final deceleration from the end point of the deceleration control with the initial deceleration to the point at which the deceleration control finally finishes. Then, the target vehicle speed generating unit 24 outputs the set initial deceleration α1 and the set final deceleration α2 to the vehicle speed track control unit 25.

The initial deceleration setting unit 241 calculates the initial deceleration at the early stage when the subject vehicle V1 shifts to the deceleration control. The final deceleration setting unit 242 calculates the final deceleration from the end point of the deceleration control with the initial deceleration to the point at which the deceleration control finally finishes. Note that, depending on the travel scene, the initial deceleration may substitute for the final deceleration.

That is, the target vehicle speed generating unit 24 sets the deceleration profile in which the deceleration between the deceleration start position P4 and the stop position P2 becomes smaller (including that the deceleration is 0) as the time until the subject vehicle V1 passes by the oncoming vehicle V2 becomes longer, compared to the case in which the time to pass each other is shorter. The target vehicle speed generating unit 24 executes the deceleration control with the deceleration in accordance with the deceleration profile. In other words, the initial deceleration α1 at the deceleration start position P4 is set to the smaller deceleration than the final deceleration α2 immediately before the stop position P2. In other words, in place of setting the deceleration between the deceleration start position P4 and the stop position P2 to the constant deceleration, a plurality of different deceleration values is set, and the plurality of the different deceleration values is set smaller as the position of the subject vehicle V1 becomes closer to the deceleration start position P4 (i.e., as the elapsed time since the deceleration starts is shorter).

In the travel scene shown in FIG. 3, the initial deceleration setting unit 241 of the target vehicle speed generating unit 24 sets the initial deceleration α1 between the deceleration start position P4 and the point at which the deceleration is switched to the value smaller than the deceleration α of the target speed profile with respect to the deceleration a of the target speed profile (i.e., a is larger than α1, and the absolute value of the slope of the graph shown is small). The final deceleration setting unit 242 of the target vehicle speed generating unit 24 sets the final deceleration α2 between the position at which the deceleration is switched to the stop position P2 larger than the initial deceleration α1, and larger than the deceleration α of the target speed profile (i.e., α2 is larger than α, and α is larger than α1, and the absolute value of the slope of the graph shown is larger).

Further, the initial deceleration setting unit 241 of the target vehicle speed generating unit 24 can set a fixed value determined in advance as the initial deceleration α1 when setting the initial deceleration α1. The fixed value is, for example, 0 to 0.7 m/s$^2$ with respect to the reference deceleration of 1.0 to 1.4 m/s$^2$. In addition, the fixed value may be a value corresponding to the distance between the passing position P3 and the stop position P2. The travel scenes shown in FIG. 4 and FIG. 5 indicate scenes in which the respective distances between the passing position P3 and the stop position P2 determined by the travelability determination unit 23 are different. The distance between the passing position P3 and the stop position P2 in the travel scene shown in FIG. 4 is larger than the distance between the passing position P3 and the stop position P2 in the travel scene shown in FIG. 5. Further, the initial deceleration setting unit 241 of the target vehicle speed generating unit 24 sets the smaller initial deceleration as the distance between the stop position P2 and the passing position P3 is larger (FIG. 4) compared to the case in which the distance between the stop position P2 and the passing position P3 is smaller (FIG. 5).

That is, the absolute value of the slope of the initial deceleration in FIG. 4 is set to be smaller than the absolute value of the slope of the initial deceleration in FIG. 5. That the distance between the stop position P2 and the passing position P3 is larger means that the position at which the subject vehicle V1 and the oncoming vehicle V2 pass each other is located in the near side relative to the stop position P2 when decelerated with the reference deceleration. Therefore, it is highly likely that the oncoming vehicle V2 returns to the original opposite lane L2 after the relatively short, elapsed time. Therefore, by setting the small initial deceleration, the subsequent movement of the oncoming vehicle V2 can be observed, and the unnecessary deceleration can be suppressed.

The initial deceleration α1 may comprise a plurality of initial deceleration values α11, α12, .... In this case, the last initial deceleration, i.e., the initial deceleration just before switching to the final deceleration, is preferably set to the smallest initial deceleration of the plurality of the initial deceleration values. This is because setting the last initial deceleration to the smallest deceleration decreases the jerk when transitioning from the deceleration travel control to the reacceleration travel control.

The final deceleration setting unit 242 of the target vehicle speed generating unit 24 sets the deceleration with which the subject vehicle V1 can be stopped at the stop position P2 on a basis of the initial deceleration α1, the timing of switching from the initial deceleration α1, and the distance to the stop position P2. For example, the final deceleration α2 may be the predetermined fixed value within the deceleration limits at which the occupant is not discomforted. The fixed values may be, for example, 1.8 to 2.2 m/s$^2$ with respect to the reference deceleration 1.0 to 1.4 m/s$^2$. In the travel scene shown in FIG. 3, the final deceleration α2 that is the predetermined fixed value is set so that the subject vehicle V1 is stopped at the stop position P2. The intersection of the speed profile in accordance with the final deceleration α2 and the initial deceleration α1 is defined as the switch position (the switch timing) to switch from the initial deceleration α1 to the final deceleration α2. Note that, the final deceleration α2 may include a plurality of final deceleration values α21, α22 ....

When it is determined that the subject vehicle V1 can be stopped at the stop position P2 with the predetermined final deceleration, the deceleration travel control continues with the final deceleration. On the other hand, when it is determined that the subject vehicle V1 cannot stop at the stop position P2 with the predetermined final deceleration (e.g., when the vehicle speed of the oncoming vehicle V2 decreased and the passing position P3 unexpectedly moves toward the stop position P2), the final deceleration setting unit 242 prioritizes the stop control of the subject vehicle V1 and resets the final deceleration larger than the predetermined final deceleration.

When the passing position P3 between the subject vehicle V1 and the oncoming vehicle V2 is on the oncoming vehicle V2 side relative to the stop position P2 as shown in FIG. 6 (e.g., when the oncoming vehicle V2 suddenly enters into the travel lane L1), the initial deceleration setting unit 241 and the final deceleration setting unit 242 of the target vehicle speed generating unit 24 set the reference deceleration a to the final deceleration in place of setting the initial deceleration α1. It is determined whether the subject vehicle V1 can be stopped at the stop position P2 on a basis of the set final deceleration α, the current position P1 of the subject vehicle V1, the current vehicle speed of the subject vehicle V1 and the stop position P2. When it is determined that the subject vehicle V1 can be stopped at the stop position P2, the reference deceleration α is set to the final deceleration α2. On the other hand, when it is determined that the subject vehicle V1 cannot stop at the stop position P2 with the reference deceleration a, the stop control of the subject vehicle V1 is prioritized, and the final deceleration α2 larger than the reference deceleration α is set.

The vehicle speed track control unit 25 acquires the initial deceleration α1 and the final deceleration α2 generated by the initial deceleration setting unit 241 and the final deceleration setting unit 242 of the target vehicle speed generating unit 24. The vehicle speed track control unit 25 generates the vehicle speed of the subject vehicle V1 in accordance with the current position of the subject vehicle V1. The vehicle speed track control unit 25 outputs the information signal to the drive control device 51 and the brake control device 53 provided in the vehicle controller of the subject vehicle V1.

The subject vehicle V1 comprises the engine 52 that is drive source, and the brake 54 that is brake source. The engine 52 is controlled by the drive control device 51. The brake 54 (the brake booster) is controlled by the brake control device 53. Then, the vehicle speed signal from the vehicle speed track control unit 25 is input to each of the drive control device 51 and the brake control device 53. Thus, the acceleration travel control, the constant speed travel control, or the deceleration travel control of the subject vehicle V1 is executed. Note that the vehicle of the present invention is not particularly limited. The vehicle includes electric vehicles (including fuel-cell vehicles) powered by motors as the drive source, hybrid vehicles comprising both of the engine and the motor, in addition to engine vehicles powered by the gasoline engines or the diesel engines as the drive source.

Figure 2A:
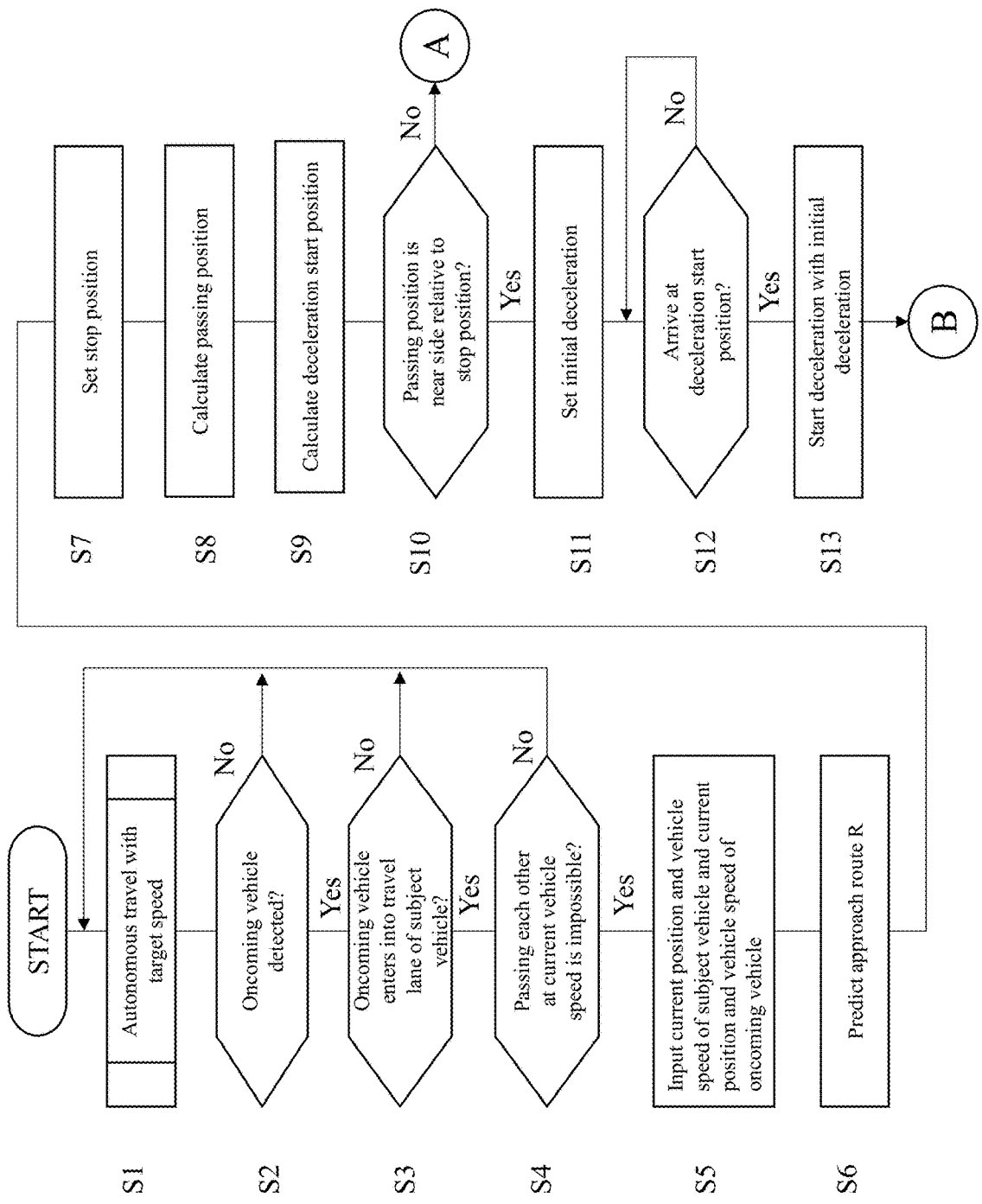
FIG. 2A is a flow chart (1/3) illustrating a procedure of a process in the passing scene executed in the travel control device for a vehicle shown in FIG. 1.
Figure 2B:
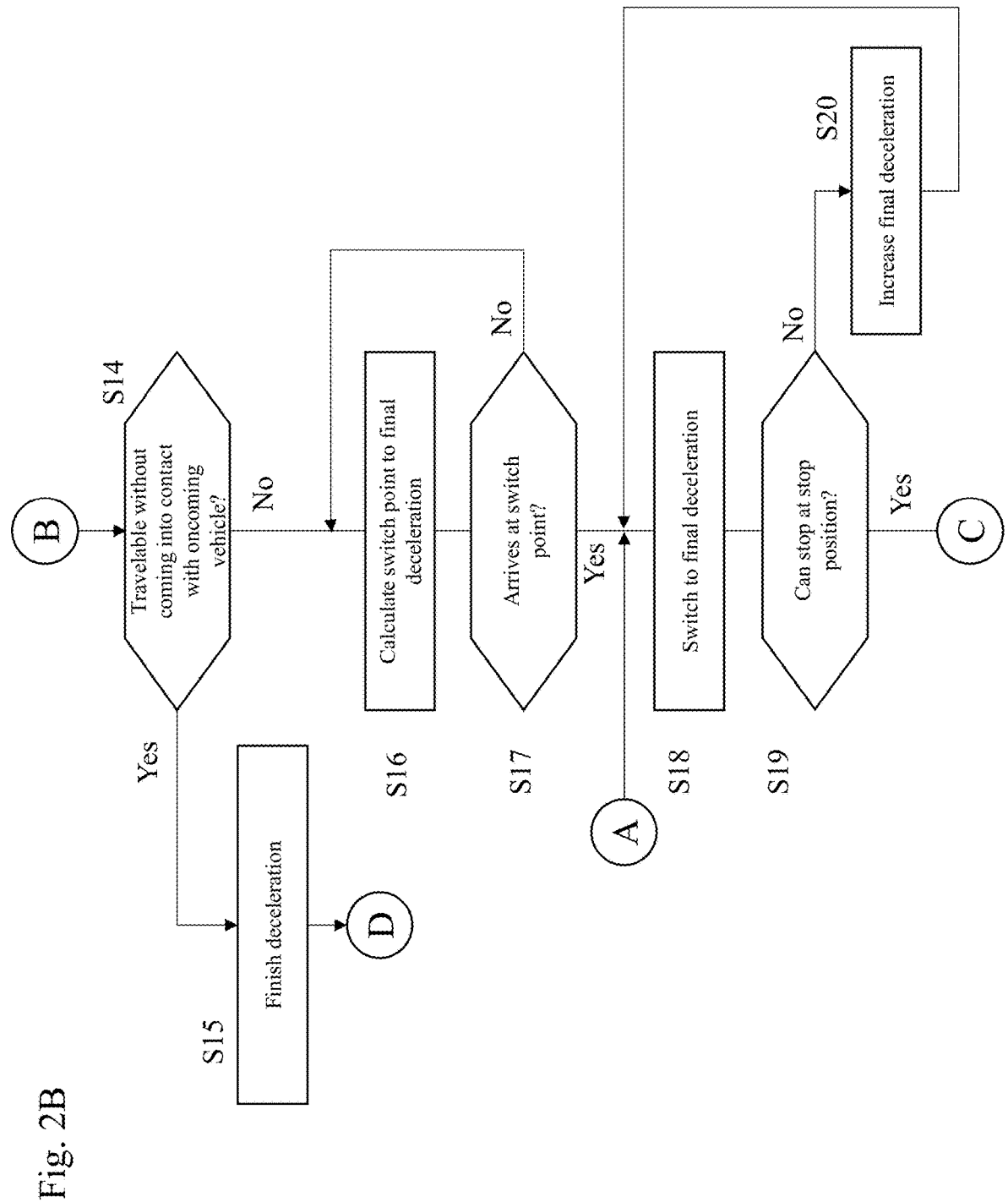
FIG. 2B is a flow chart (2/3) illustrating the procedure of the process in the passing scene executed in the travel control device for a vehicle shown in FIG. 1.

In the following, a control flow of the travel control device VTC of the present embodiment is described. The flow charts shown in FIG. 2A and FIG. 2B illustrate the procedure of the process in the passing scene executed by the travel control device VTC shown in FIG. 1. The flow charts are executed at the predetermined time intervals.

In the step S1 of the subroutine, the subject vehicle V1 is assumed to autonomously travel toward the destination by the autonomous travel function. In the step S2, during the autonomous travel of the subject vehicle V1, the oncoming vehicle route predicting unit 21 of the travel control device VTC detects whether the oncoming vehicle V2 travelling in the opposite lane L2 of the subject vehicle V1 exists by the radar device 11 and the camera 12. When the oncoming vehicle V2 travelling in the opposite lane L2 exists, in the step S3, it is predicted whether the oncoming vehicle V2 enters into the travel lane L1 in which the subject vehicle V1 travels. When the oncoming vehicle V2 is not detected in the step S2, and even the oncoming vehicle V2 exists, when it is predicted that the oncoming vehicle V2 does not enter into the travel lane L1 in which the subject vehicle V1 travels in the step S3, the process returns to the step S1 and the autonomous travel is continued. Note that when the oncoming vehicle V2 is detected in the step S2, the distance between the subject vehicle V1 and the oncoming vehicle V2 may also detected, and when the distance is shorter than the predetermined distance, the deceleration control of the subject vehicle V1 may be executed at the large deceleration corresponding to the emergency brake.

In the step S3, when it is predicted that the oncoming vehicle V2 enters into the travel lane L1 in which the subject vehicle V1 travels, the process proceeds to the step S4. In the step S4, the travelability determination unit 23 determines whether the subject vehicle V1 can pass by the oncoming vehicle V2 without coming into contact with the oncoming vehicle V2 in the case that the subject vehicle V1 travels at the current vehicle speed, on the basis of the current position of the subject vehicle speed V1, the vehicle speed of the subject vehicle V1, the current position of the oncoming vehicle V2, and the vehicle speed of the oncoming vehicle V2. When it is determined that the subject vehicle V1 and the oncoming vehicle V2 cannot pass each other without coming into contact with each other, the process proceeds to the step S5. In the step S4, when it is determined that the subject vehicle V1 and the oncoming vehicle V2 can pass each other, the process returns to the step S1, and the autonomous travel is continued.

In the step S4, when it is determined that the subject vehicle V1 cannot pass by the oncoming vehicle V2 unless the subject vehicle V1 decelerates, in the step S5, the travelability determination unit 23 acquires the current position of the subject vehicle V1, the vehicle speed of the subject vehicle V1, the current position of the oncoming vehicle V2, and the vehicle speed of the oncoming vehicle V2. Then, in the step S6, the travelability determination unit 23 predicts the approach route R of the oncoming vehicle V2. Since the approach route R of the oncoming vehicle V2 is generated by the oncoming vehicle route predicting unit 21, the approach route R is output to the travelability determination unit 23 in addition to the current position of the subject vehicle V1, the vehicle speed of the subject vehicle V1, the current position of the oncoming vehicle V2, and the vehicle speed of the oncoming vehicle V2.

In the step S7, the travelability determination unit 23 sets the stop position P2 of the subject vehicle V1 using the approach route R of the oncoming vehicle V2. Subsequently, in the step S8, the travelability determination unit 23 sets the target vehicle speed profile for controlling the travel with the predetermined reference deceleration a. The travelability determination unit 23 calculates the passing position P3 at which the subject vehicle V1 and the oncoming vehicle V2 pass each other using the target vehicle speed profile and the vehicle speed of the oncoming vehicle V2.

The calculation of the passing position P3 is explained in the following. In the travel scene shown in FIG. 3, the stop position P2 of the subject vehicle V1 is set on the basis of the approach route R of the oncoming vehicle V2. A bottom (an extreme value) of the parabola shown in FIG. 3 is adjusted to the stop position P2 so that the vehicle speed of the subject vehicle V1 becomes 0 at the stop position P2. The parabola assumes that the target speed profile in which the deceleration $\alpha$ is constant. In the step S9, the intersection of the straight line representing the current vehicle speed of the subject vehicle V1 and the parabola of the target speed profile is determined as the deceleration start position P4 of the subject vehicle V1. When the subject vehicle V1 travels while maintaining the current vehicle speed and starts deceleration in accordance with the reference deceleration $\alpha$ of the target speed profile at the deceleration start position P4, the subject vehicle V1 decreases the speed in accordance with the target speed profile and stops at the stop position P2. The passing position P3 at which the subject vehicle V1 and the oncoming vehicle V2 pass each other is calculated using the target speed profile and the vehicle speed of the oncoming vehicle V2 at this time.

Once the passing position P3 and the deceleration start position P4 are calculated, in the step S10, it is determined whether the passing position P3 is on the near side (the subject vehicle side) or the far side relative to the stop position P2. When the passing position P3 is on the near side, the process proceeds to the step S11. When the passing position P3 is on the far side relative to the stop position P2, the process proceeds to the step S16 in FIG. 2B.

When the calculated the passing position P3 is on the near side relative to the stop position P2, the initial deceleration $\alpha 1$ is set in the step S11. That is, the initial deceleration $\alpha 1$ at the deceleration start position P4 is set to the smaller deceleration than the final deceleration $\alpha 2$ immediately before the stop position P2. In other words, in place of setting the deceleration between the deceleration start position P4 and the stop position P2 constant, a plurality of different deceleration values is set. In addition, the plurality of different deceleration values is set to become smaller with approaching the deceleration start position P4 (i.e., as the elapsed time since the deceleration starts is shorter). Further, as shown in FIG. 4 and FIG. 5, in setting the initial deceleration $\alpha 1$, the larger the distance between the stop position P2 and the passing position P3 is (FIG. 4), the smaller the initial deceleration may be set, compared to the case in which the distance between the stop position P2 and the passing position P3 is smaller (FIG. 5).

Once the initial deceleration $\alpha 1$ is set, in the step S12, it is determined whether the current position P1 of the subject vehicle V1 arrives at the deceleration start position P4.

When the current position P1 of the subject vehicle V1 arrives at the deceleration start position P4, the deceleration is started as described in the step S13. The step S12 is repeated until the current position P1 of the subject vehicle V1 arrives at the deceleration start position P4. Note that, when the subject vehicle it is determined 1 does not arrive at the deceleration start position P4, the acceleration travel control may be executed, the deceleration travel control may not be executed, the constant speed travel control may be executed, or the subject vehicle may be coasted by lifting a throttle and without stepping the brake. In the process for starting the deceleration in the step S13, the target vehicle speed is output from the vehicle speed track control unit 25 to the drive control device 51 and the brake control device 53. Along with the drive control device 51 controls the engine 52, the brake control device 53 controls the brake 54, so that the process is executed.

Figure 7:
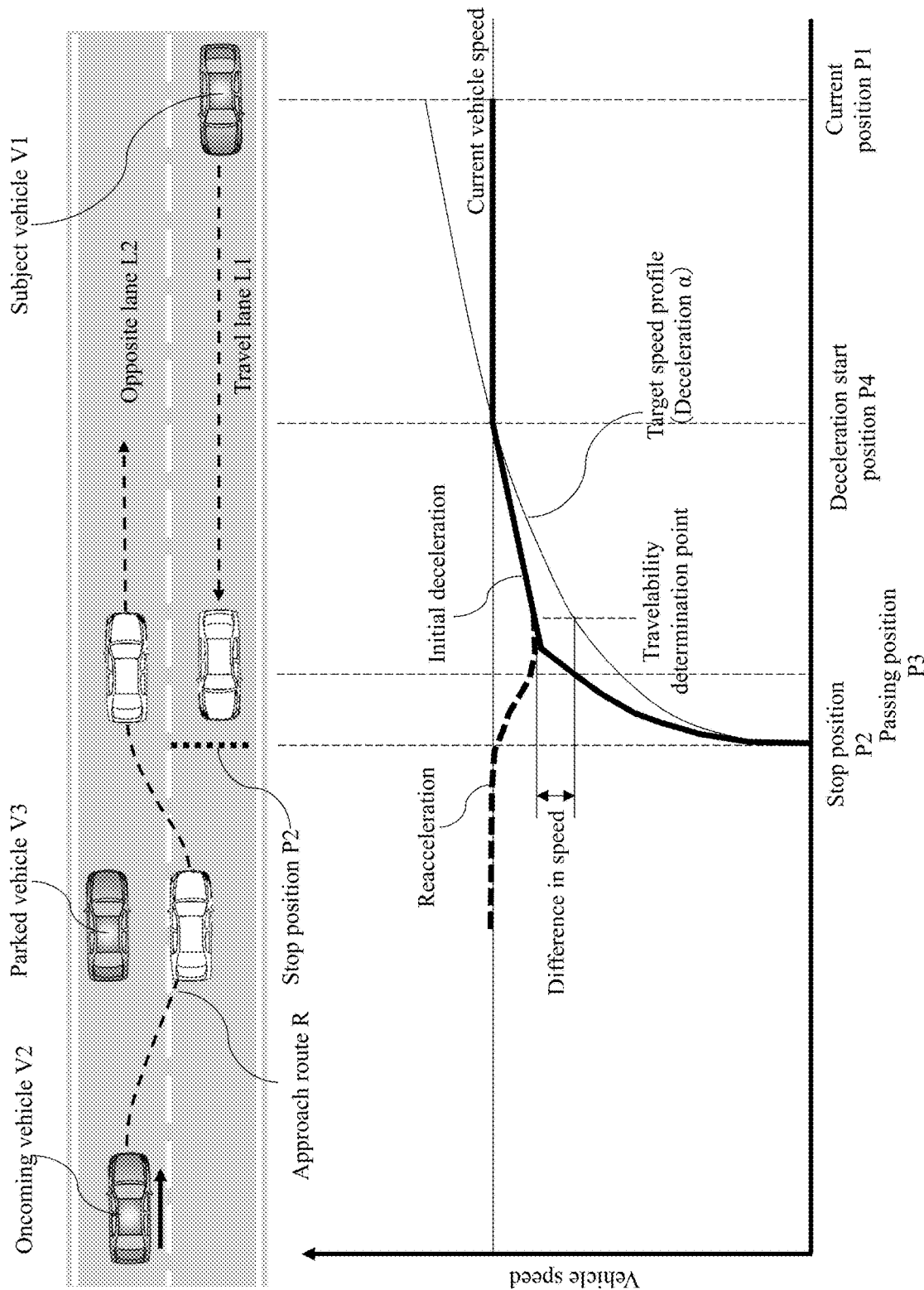
FIG. 7 is a plan view illustrating a fifth example of the passing scene and a graph illustrating the deceleration profile corresponding to this scene.

In the step S14, it is determined whether the subject vehicle V1 can pass by the oncoming vehicle V2 without coming into contact with the oncoming vehicle V2 on the basis of the current position P1 of the subject vehicle V1, the vehicle speed of the subject vehicle V1, the current position of the oncoming vehicle V2, and the vehicle speed of the oncoming vehicle V2. That is, in the step S13, the deceleration of the subject vehicle V1 with the initial deceleration α1 starts and the travel situation of the oncoming vehicle V2 and the like after the deceleration is detected. When it is determined that the subject vehicle V1 can pass by the oncoming vehicle V2 without coming into contact with each other, the process proceeds to the step S15. In the step S15, the deceleration is terminated, and the process returns to the autonomous travel control in the step S1. FIG. 7 is the diagram illustrating the scene in which the determination is made to proceed from the step S14 to the step S15 at the travelability determination point with respect to the subject vehicle V1 that starts the deceleration from the deceleration start position P4 with the initial deceleration α1. The subject vehicle V1 returns to the autonomous travel control of the step S1, whereby the return to the set speed is achieved by the reacceleration indicated by the dotted line in FIG. 7. At this time, the jerk between the vehicle speed decelerated with the initial deceleration α1 and the vehicle speed after the return becomes smaller as the initial deceleration α1 is smaller. That is, when decelerating with the deceleration a indicated in the target speed profile of FIG. 7, the jerk between the vehicle speed at the travelability determination point and the vehicle speed after the return increases in accordance with the difference of speed as shown in the figure.

When it is determined in the step S14 that the subject vehicle V1 cannot pass by the oncoming vehicle V2 without coming into contact with the oncoming vehicle V2, the process proceeds to the step S16. In the steps S16 to S18, the switch position (the switch timing) is calculated from the currently set initial deceleration α1 to the next set final deceleration α2. At the same time, it is determined whether the subject vehicle arrives at the switch position. That is, in the step S16, the final deceleration setting unit 242 of the target vehicle speed generating unit 24 sets the final deceleration α2 with which the subject vehicle V1 can be stopped at the stop position P2, on the basis of the initial deceleration α1, the switch timing from the initial deceleration α1, and the distance to the stop position P2. For example, in the travel scene shown in FIG. 3, the final deceleration α2 that is the predetermined fixed value is set so that the subject vehicle V1 stops at the stop position P2. The intersection of the speed profile in accordance with the final deceleration α2 and the initial deceleration α1 is defined as the switch position (the switch timing) from the initial deceleration α1 to the final deceleration α2. Then, in the step S17, it is determined whether the subject vehicle V1 arrives at the switch position (the switch timing). In the step S18, at the timing at which it is determined that the subject vehicle V1 arrives at the switch position, the deceleration is switched from the initial deceleration α1 to the final deceleration α2.

Note that, in the step S10 of FIG. 2A, when the passing position P3 at which the subject vehicle V1 and the oncoming vehicle V2 pass each other is on the far side relative to the stop position P2 as shown in FIG. 6, the process proceeds from the step S10 to the step S18. In place of setting the initial deceleration α1, the deceleration control with the final deceleration α2 starts from the deceleration start position P4, as shown in FIG. 6. This allows the subject vehicle V1 to prevent from coming into contact with the oncoming vehicle V2.

In the step S18 described above, the deceleration is switched to the deceleration with the final deceleration α2, and the subject vehicle V1 shifts to the travel control for stopping at the stop position P2. In the step S19, it is determined whether the subject vehicle V1 can be stopped at the stop position P2 on the basis of the current position P1 of the subject vehicle V1, the vehicle speed of the subject vehicle V1, and the distance to the stop position P2. When it is determined that the subject vehicle V1 can be stopped at the stop position P2, the process proceeds to the step S21 of FIG. 2C. On the other hand, when it is determined that the subject vehicle V1 cannot stop at the stop position P2, the process proceeds to the step S19. In the step S19, the final deceleration α2 is set again that is acquired by increasing the value of the currently set final deceleration α2. Then, the process returns to the step S18 while executing the deceleration control with the final deceleration α2. By adjusting the final deceleration α2, the subject vehicle V1 can be surely stopped at the stop position P2.

Figure 2C:
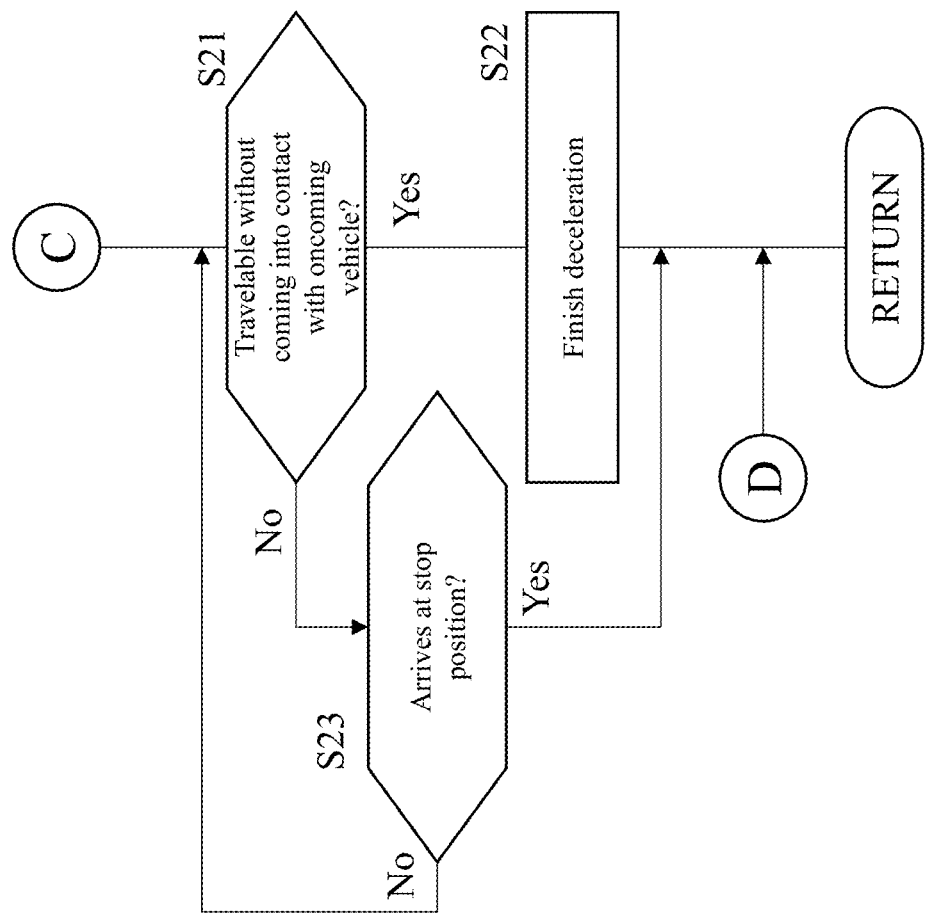
FIG. 2C is a flow chart (3/3) illustrating the procedure of the process in the passing scene executed in the travel control device for a vehicle shown in FIG. 1.

In the step S21 of FIG. 2C, it is determined whether the subject vehicle V1 can pass by the oncoming vehicle V2 without coming into contact with the oncoming vehicle V2 on the basis of the current position P1 of the subject vehicle V1, the vehicle speed of the subject vehicle V1, the current position of the oncoming vehicle V2 and the vehicle speed of the oncoming vehicle V2. That is, in the step S18, the deceleration of the subject vehicle V1 is switched to the deceleration with the final deceleration α2, and the subsequent travel situation of the oncoming vehicle V2 is detected. When it is determined that the subject vehicle V1 and the oncoming vehicle V2 can pass each other without coming into contact with each other, the process proceeds to the step S22. In the step S22, the deceleration is terminated, and the process returns to the autonomous travel control of the step S1. As a result, the subject vehicle V1 reaccelerates and returns to the vehicle speed set by the autonomous travel control. Note that, in the step S22, when returning to the autonomous travel control of the step S1 by terminating the deceleration, the target vehicle speed that conforms to the deceleration smaller than the initial deceleration is generated, there is no need to decrease the deceleration in all the sections from the position at which the deceleration control is stopped to the passing position.

On the other hand, when it is determined in the step S21 that the subject vehicle V1 cannot pass by the oncoming vehicle V2 without coming into contact with the oncoming vehicle V2, the process proceeds to the step S23. In the step S23, the deceleration with the final deceleration α2 is continued until the subject vehicle arrives at the stop position P2.

As stated above, according to the travel control device and the travel control method of the present embodiment, when the oncoming vehicle V2 is predicted to enter into the travel lane L1 in which the subject vehicle V1 travels, the initial deceleration of the subject vehicle V1 in the case of time until the subject vehicle V1 and the oncoming vehicle V2 pass each other being relatively long is set to the smaller value than the initial deceleration in the case of the time being relatively short. As an example, the subject vehicle V1 is decelerated with the deceleration in accordance with the deceleration profile that is indicated by the thick line in FIG. 3. This ensures the grace time for making the determination on the travel control of the subject vehicle V1, such as whether to stop or accelerate the subject vehicle V1. In other words, the travel control of the subject vehicle V1 can be executed in response to the behavior of the oncoming vehicle V2 in the grace time. Therefore, it is possible to suppress the unnecessary stop or the unnecessary acceleration. As a result, the discomfort of the occupant can be suppressed.

In particular, in the travel scene of the present embodiment in which the subject vehicle V1 decelerates in accordance with the oncoming vehicle V2, even when it is initially determined that the deceleration is necessary, since there are various changes in the behaviors, for example, the deceleration or stop of the oncoming vehicle V2 or the acceleration of the oncoming vehicle V2 to overtake the parked vehicle, there is a high possibility that the deceleration is not necessary thereafter. In other words, particular attention needs to be paid to the changes in the behavior for the reacceleration, since it is highly likely to execute the reacceleration control after the deceleration in the travel scene. In that sense, the travel control device and the travel control method of the present embodiment is effectively applied to the travel scene in which the subject vehicle V1 decelerates in response to the oncoming vehicle V2.

According to the travel control device and the travel control method of the present embodiment, the deceleration start position P4 is determined at which the deceleration of the subject vehicle V1 starts so that the subject vehicle V1 does not come into contact with the oncoming vehicle V2 entering into the travel lane L1. Then, whether the subject vehicle V1 arrives at the deceleration start position P4 is detected. When the subject vehicle V1 arrives at the deceleration start position P4, the deceleration travel control of the subject vehicle V1 is executed. In particular, whether the subject vehicle V1 arrives at the deceleration start position P4 may be detected, and the deceleration travel control may be executed once the subject vehicle V1 arrives at the deceleration start position P4, with the initial deceleration larger than the initial deceleration in the case that the subject vehicle V1 does not arrive at the deceleration start position P4.

Alternatively, the stop position P2 for stopping the subject vehicle V1 so that the subject vehicle V1 does not come into contact with the oncoming vehicle V2 entering into the travel lane L1 in which the subject vehicle V1 travels is set on the basis of the situation ahead of the subject vehicle V1. Further, the deceleration start position P4 for starting the deceleration of the subject vehicle V1 is determined on the basis of the set stop position P2, the current position P1 of the subject vehicle V1, the current vehicle speed of the subject vehicle V1, the predetermined reference deceleration, and the initial deceleration. Then, whether the subject vehicle V1 arrives at the deceleration start position P4 is detected, and once the subject vehicle V1 arrives at the deceleration start position P4, the deceleration travel control of the subject vehicle V1 is executed. At this time, the target vehicle speed profile for decelerating the subject vehicle V1 with the predetermined reference deceleration from the current position P1 may be set, the passing position P3 at which the subject vehicle V1 and the oncoming vehicle V2 pass each other may be determined on the basis of the target vehicle speed profile and vehicle speed of the oncoming vehicle V2, and the initial deceleration upon executing the deceleration travel control of the subject vehicle V1 may be set on the basis of the relative positional relation between the stop position P2 and the passing position P3.

Further, according to the travel control device and the travel control method of the present embodiment, when the passing position P3 at which the subject vehicle V1 and the oncoming vehicle V2 pass each other is on the subject vehicle side (the near side) relative to the stop position P2, the initial deceleration α1 in the case of the distance between the stop position P2 and the passing position P3 being relatively large is set smaller than the predetermined reference deceleration α and smaller than the initial deceleration in the case of the distance between the stop position P2 and the passing position P3 being relatively small. As a result, the larger the distance between the stop position P2 and the passing position P3 is, the longer the grace time for making the determination on the travel control of the subject vehicle V1 can be secured. In other words, the travel control of the subject vehicle V1 can be executed in response to the behavior of the oncoming vehicle V2 in the grace time. Therefore, it is possible to further suppress the unnecessary stop or the unnecessary acceleration. As a result, the discomfort of the occupant can be further suppressed.

Further, according to the travel control device and the travel control method of the present embodiment, on the basis of the set stop position P2, the current position P1 of the subject vehicle V1, the current vehicle speed of the subject vehicle V1, and the predetermined reference deceleration a, the deceleration start position P4 ahead of the subject vehicle V1 is determined. Then, whether the subject vehicle V1 arrives at the deceleration start position P4 is detected. When the subject vehicle V1 arrives at the deceleration start position P4, the deceleration travel control of the subject vehicle V1 is executed. As a result, the long grace time for making the determination on the travel control of the subject vehicle V1 can be secured. At the same time, the subject vehicle V1 can be stopped at the stop position P1 at the optimum time.

Further, according to the travel control device and the travel control method of the present embodiment, when the deceleration travel control of the subject vehicle V1 is executed with the set initial deceleration α1, the set initial deceleration α1 is switched to the predetermined final deceleration α2 at the timing at which the subject vehicle V1 can be stopped at the stop position P2 when the set initial deceleration α1 is switched to the predetermined final deceleration α2. The final deceleration α2 is used to the deceleration travel control of the subject vehicle V1. As a result, the long grace time for making the determination on the travel control of the subject vehicle V1 can be secured. At the same time, the subject vehicle V1 can be surely stopped at the stop position P2.

Further, according to the travel control device and the travel control method of the present embodiment, when it is determined that the subject vehicle V1 cannot be stopped at the stop position P2 during the period to switch the initial deceleration α1 to the predetermined final deceleration α2, the final deceleration is switched to the deceleration larger than the predetermined final deceleration α2. Then, the deceleration travel control of the subject vehicle V1 is executed. As a result, the long grace time for making the determination on the travel control of the subject vehicle V1 can be secured. At the same time, the subject vehicle V1 can be surely stopped at the stop position P2 even when the travel situation changes.

Further, according to the travel control device and the travel control method of the present embodiment, the initial deceleration α1 is the predetermined value. This enables to set the deceleration that does not discomfort the occupant.

Further, according to the travel control device and the travel control method of the present embodiment, the initial deceleration α1 includes the plurality of initial deceleration values. As a result, the long grace time for making the determination on the travel control of the subject vehicle V1 can be secured. At the same time, the vehicle speed before and after passing by can be set so that the jerk becomes small.

Further, according to the travel control device and the travel control method of the present embodiment, the initial deceleration α1 includes the plurality of initial deceleration values. Further, the initial deceleration that is set finally in terms of time (i.e., the initial deceleration just before switching to the final deceleration α2) is set to the smallest initial deceleration of the plurality of initial deceleration values. As a result, the long grace time for making the determination on the travel control of the subject vehicle V1 can be secured. At the same time, the jerk at the time of the reacceleration after passing by is decreased.

Further, according to the travel control device and the travel control method of the present embodiment, when the passing position P3 is on the oncoming vehicle side (the far side) relative to the stop position P2, instead of setting the initial deceleration α1, the predetermined reference deceleration α is set to the final deceleration. Further, whether the subject vehicle V1 can be stopped at the stop position P2 is determined on the basis of the set final deceleration α, the current position P1 of the subject vehicle V1, the current vehicle speed of the subject vehicle V1, and the stop position P2. As a result, when it is determined that the subject vehicle V1 cannot be stopped at the stop position P2, the final deceleration is switched to the deceleration larger than the set final deceleration α. As a result, the long grace time for making the determination on the travel control of the subject vehicle V1 can be secured. At the same time, the subject vehicle V1 can be surely stopped at the stop position P2 even when the travel situation changes.

Further, according to the travel control device and the travel control method of the present embodiment, the behavior of the oncoming vehicle V2 is detected while executing the deceleration travel control of the subject vehicle V1 with the deceleration in accordance with the deceleration profile. Then, it is predicted whether the subject vehicle V1 can travel in the travel lane L1 without coming into contact with the oncoming vehicle V2. When it is predicted that the subject vehicle V1 can travel in the travel lane L1 without coming into contact with the oncoming vehicle V2, the deceleration travel control is stopped, and the target speed is generated in which the deceleration is not performed. As a result, the long grace time for making the determination on the travel control of the subject vehicle V1 can be secured. At the same time, it is possible to smoothly transit to the subsequent travel control, such as executing the reacceleration control.

In the travel control device and the travel control method of the present embodiment as mentioned above, the values of the deceleration α, α1, and α2 are set to the appropriate values as control factors. However, the vehicle speed corresponding to the deceleration α, α1, and α2 may be used as the control factors.

DESCRIPTION OF REFERENCE NUMERALS

VTC . . . Vehicle travel controller (travel control device for a vehicle)
11 . . . Radar device
12 . . . Camera
13 . . . Map database
14 . . . Position detecting device
15 . . . Vehicle speed sensor
21 . . . Oncoming vehicle route predicting unit
22 . . . Subject vehicle route predicting unit
23 . . . Travelability determination unit
24 . . . Target vehicle speed generating unit
25 . . . Vehicle speed track control unit
51 . . . Drive control device
52 . . . Engine
53 . . . Brake control device
54 . . . Brake
V1 . . . Subject vehicle
V2 . . . Oncoming vehicle
V3 . . . Parked vehicle
L1 . . . Travel lane
L2 . . . Opposite lane
P1 . . . Current position of subject vehicle
P2 . . . Stop position
P3 . . . Passing position
P4 . . . Deceleration start position
R . . . Approach route
α . . . Reference deceleration
α1 . . . Initial deceleration
α2 . . . Final deceleration

The invention claimed is:

1. A travel control method for a vehicle having an autonomous travel control function, comprising:
   detecting an oncoming vehicle travelling toward a subject vehicle;
   predicting whether the oncoming vehicle enters into a travel lane in which the subject vehicle travels;
   when it is predicted that the oncoming vehicle enters into the travel lane in which the subject vehicle travels, setting initial deceleration of the subject vehicle in a case of time until the subject vehicle and the oncoming vehicle pass each other being relatively long to a smaller value than the initial deceleration in a case of the time being relatively short; and
   executing deceleration travel control of the subject vehicle,
   wherein the deceleration travel control of the subject vehicle is executed at a deceleration start position for starting deceleration of the subject vehicle not to come into contact with the oncoming vehicle that is predicted to enter into the travel lane.

2. The travel control method for a vehicle according to claim 1, comprising:
   determining the deceleration start position for starting the deceleration of the subject vehicle so as not to come into contact with the oncoming vehicle that is predicted to enter into the travel lane in which the subject vehicle travels;

detecting whether or not the subject vehicle arrives at the deceleration start position; and
executing the deceleration travel control of the subject vehicle upon the subject vehicle arriving at the deceleration start position.

3. The travel control method for a vehicle according to claim 2, comprising:
detecting whether or not the subject vehicle arrives at the deceleration start position; and
executing the deceleration travel control upon the subject vehicle arriving at the deceleration start position, with the initial deceleration larger than the initial deceleration in a case that the subject vehicle does not arrive at the deceleration start position.

4. The travel control method for a vehicle according to claim 2, comprising:
setting a stop position for stopping the subject vehicle so as not to come into contact with the oncoming vehicle that is predicted to enter into the travel lane in which the subject vehicle travels, on a basis of a situation ahead of the subject vehicle;
determining the deceleration start position for starting the deceleration of the subject vehicle on a basis of the set stop position, a current position of the subject vehicle, current vehicle speed of the subject vehicle, predetermined reference deceleration, and the initial deceleration;
detecting whether or not the subject vehicle arrives at the deceleration start position; and
executing the deceleration travel control of the subject vehicle upon the subject vehicle arriving at the deceleration start position.

5. The travel control method for a vehicle according to claim 4, comprising:
setting a target vehicle speed profile for decelerating the subject vehicle with the predetermined reference deceleration from the current position;
determining a passing position at which the subject vehicle and the oncoming vehicle pass each other on a basis of the target vehicle speed profile and vehicle speed of the oncoming vehicle; and
setting the initial deceleration upon executing the deceleration travel control of the subject vehicle on a basis of a relative positional relation between the stop position and the passing position.

6. The travel control method of a vehicle according to claim 5, comprising:
when the passing position is on a subject vehicle side relative to the stop position, setting the initial deceleration in a case of a distance between the stop position and the passing position being relatively large smaller than the predetermined reference deceleration and the initial deceleration in a case of the distance being relatively small; and
executing the deceleration travel control of the subject vehicle with the set initial deceleration.

7. The travel control method for a vehicle according to claim 5, comprising:
setting the predetermined reference deceleration to final deceleration in place of setting the initial deceleration when the passing position is on an oncoming vehicle side relative to the stop position;
determining whether or not the subject vehicle can be stopped at the stop position on a basis of the set final deceleration, the current position of the subject vehicle, the current vehicle speed of the subject vehicle, and the stop position;
switching the set final deceleration to final deceleration larger than the set final deceleration when it is determined that the subject vehicle cannot stop at the stop position; and
executing the deceleration travel control of the subject vehicle with the set final deceleration or with the final deceleration larger than the set final deceleration.

8. The travel control method for a vehicle according to claim 4, comprising:
setting the stop position for stopping the subject vehicle so as not to come into contact with the oncoming vehicle that is predicted to enter into the travel lane in which the subject vehicle travels, on a basis of an approach route of the oncoming vehicle;
setting the target vehicle speed profile for controlling travel of the subject vehicle with the predetermined reference deceleration while the subject vehicle travels from the current position to the stop position and stops at the stop position;
determining a passing position at which the subject vehicle and the oncoming vehicle pass each other, on a basis of the target vehicle speed profile and vehicle speed of the oncoming vehicle; and
setting the initial deceleration upon executing the deceleration travel control of the subject vehicle on a basis of a relative positional relation between the stop position and the passing position.

9. The travel control method for a vehicle according to claim 4, comprising:
switching the set initial deceleration to predetermined final deceleration at a timing at which the subject vehicle can be stopped at the stop position when the set initial deceleration is switched to the predetermined final deceleration, when executing the deceleration travel control of the subject vehicle with the set initial deceleration; and
executing the deceleration travel control of the subject vehicle with the predetermined final deceleration.

10. The travel control method for a vehicle according to claim 4, comprising:
switching the predetermined final deceleration to final deceleration larger than the predetermined final deceleration when a distance between the set stop position and the subject vehicle is a first predetermined distance; and
executing the deceleration travel control of the subject vehicle.

11. The travel control method for a vehicle according to claim 1, wherein the initial deceleration is a predetermined value.

12. The travel control method for a vehicle according to claim 1, wherein the initial deceleration includes a plurality of initial deceleration values.

13. The travel control method for a vehicle according to claim 12, wherein the set initial deceleration finally in terms of time is the smallest initial deceleration of the plurality of the initial deceleration values.

14. The travel control method for a vehicle according to claim 1, comprising:
setting the stop position for stopping the subject vehicle so as not to come into contact with the oncoming vehicle that is predicted to enter into the travel lane in which the subject vehicle travels;
setting the target vehicle speed profile for controlling travel of the subject vehicle with predetermined reference deceleration while the subject vehicle travels from the current position to the stop position and stops at the stop position;

determining a passing position at which the subject vehicle and the oncoming vehicle pass each other, on a basis of the target vehicle speed profile and vehicle speed of the oncoming vehicle;

when the passing position is on a subject vehicle side relative to the stop position, setting initial speed in a case of a distance between the stop position and the passing position being relatively large smaller than a speed conforming to the reference deceleration in a case of the distance being relatively small; and executing the travel control of the subject vehicle so that the set initial speed is achieved.

15. The travel control method for a vehicle according to claim 14, wherein the initial speed is speed conforming to the smallest deceleration at the passing position.

16. The travel control method for a vehicle according to claim 1, comprising:

detecting the oncoming vehicle travelling on an opposite lane of the travel lane in which the subject vehicle travels;

calculating a distance between the subject vehicle and the oncoming vehicle when the oncoming vehicle is detected;

predicting whether or not the oncoming vehicle enters into the travel lane in which the subject vehicle travels when the distance is longer than a second predetermined distance; and when it is predicted that the oncoming vehicle enters into the travel lane in which the subject vehicle travels, executing the deceleration travel control of the subject vehicle with deceleration of the subject vehicle, the deceleration being set to a smaller value in a case of the time until the subject vehicle and the oncoming vehicle pass each other being relatively long than the deceleration in a case of the time being relatively short.

17. A travel control method for a vehicle having an autonomous travel control function, comprising:

detecting an oncoming vehicle travelling toward a subject vehicle;

predicting whether or not the oncoming vehicle enters into a travel lane in which the subject vehicle travels;

when it is predicted that the oncoming vehicle enters into the travel lane in which the subject vehicle travels, setting initial deceleration of the subject vehicle in a case of time until the subject vehicle and the oncoming vehicle pass each other being relatively long to a smaller value than the initial deceleration in a case of the time being relatively short; and executing deceleration travel control of the subject vehicle, the travel control method further comprising:

detecting movement of the oncoming vehicle while executing the deceleration travel control of the subject vehicle with the initial deceleration;

predicting whether or not the subject vehicle can travel in the travel lane in which the subject vehicle travels without coming into contact with the oncoming vehicle; and setting deceleration smaller than the initial deceleration while executing the deceleration travel control when it is predicted that the subject vehicle can travel in the travel lane in which the subject vehicle travels without coming into contact with the oncoming vehicle.

18. A travel control device for a vehicle comprising a controller, the controller executing autonomous travel control by controlling at least one of a steering device, a driving device, and a braking device in accordance with a travel route of subject vehicle, and the controller being configured to:

detect an oncoming vehicle travelling toward the subject vehicle;

predict whether or not the oncoming vehicle enters into a travel lane in which the subject vehicle travels;

when it is predicted that the oncoming vehicle enters into the travel lane in which the subject vehicle travels, set initial deceleration of the subject vehicle in a case of time until the subject vehicle and the oncoming vehicle pass each other being relatively long to a smaller value than the initial deceleration in a case of the time being relatively short; and execute deceleration travel control of the subject vehicle, wherein the deceleration travel control of the subject vehicle is executed at a deceleration start position for starting deceleration of the subject vehicle so as not to come into contact with the oncoming vehicle that is predicted to enter into the travel lane.

* * * * *